J. M. NUGENT.
CONVERTIBLE SAW.
APPLICATION FILED MAR. 24, 1914.
1,135,912.
Patented Apr. 13, 1915.
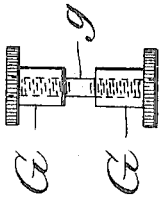
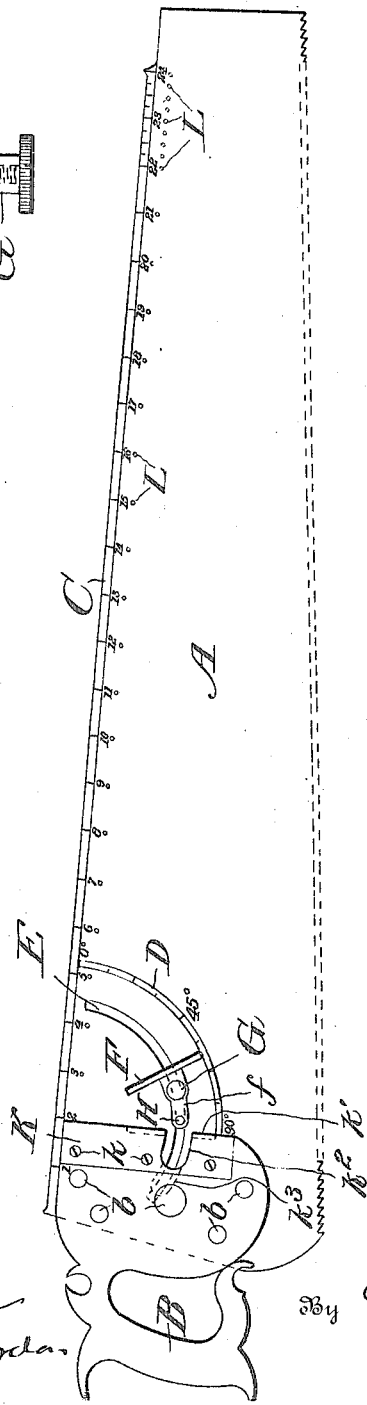

UNITED STATES PATENT OFFICE.

JAMES M. NUGENT, OF EAST QUOGUE, NEW YORK, ASSIGNOR OF ONE-HALF TO FREDERICK SEEBER, OF NEW YORK, N. Y.

CONVERTIBLE SAW.

1,135,912. Specification of Letters Patent. Patented Apr. 13, 1915.

Application filed March 24, 1914. Serial No. 826,992.

*To all whom it may concern:*

Be it known that I, JAMES M. NUGENT, a citizen of the United States, residing at East Quogue, in the county of Suffolk and State of New York, have invented certain new and useful Improvements in Convertible Saws, of which the following is a full, clear, and exact specification.

This invention relates to saws and has for its object to provide a saw which is also adapted to be used as a measuring rule, as a try-square, and as a gage for various angles.

A further object is to provide a saw adapted to all these uses which is compact but simple in construction and which is durable. Another object to construct the saw and its attachments in such a way that either side of the saw may be used for carrying out any of the purposes for which the compound tool is intended.

Other objects will appear as the description proceeds.

The invention will be first hereinafter described in connection with the accompanying drawings and then more particularly defined in the claim at the end of the description.

In the accompanying drawings, wherein similar reference characters are used throughout the several views to designate corresponding parts:—Figure 1 is a side view of a saw constructed in accordance with my invention, the gage being shown in an intermediate position. Fig. 2 is a section transversely of portions of the saw blade and handle, through the curved slot which guides the gage, the gage itself being shown in edge view. Fig. 3 is a cross section of the saw blade looking directly at the handle, the gage being shown withdrawn into its pocket in the handle so that its outer face is flush with the edge of the handle which constitutes one part of the try-square, and Fig. 4 is a detailed view of the bolt and thumb nuts for holding the gage at any desired position.

Referring more particularly to the drawings, A designates the saw blade and B the handle which is secured thereto by rivets $b$. The saw blade and handle are made exactly alike on both sides, so that a description of one side will suffice in most particulars. The upper edge of the blade is straight and marked off to serve as a measuring rule, as at C.

Near the handle a curved slot E is formed in the blade, and concentric with said slot an angle scale D is marked on the faces of the blade extending from the handle to the rear edge of said blade and indicating angles up to 90°. Mounted to slide along the slot is an adjustable gage consisting of a similar plate portion F on each side of the blade, said plate portions having extending portions or lugs $f$ preferably curved to conform to the slot E. The end portions of said lugs $f$ are connected together by a screw H which holds them close to the opposite faces of the blade without binding, said screw passing loosely through the slot E and serving as a guide for the gage. Spaced from the screw H and arranged near the plate portions F of the gage, a set screw $g$ is passed loosely through the slot E and the lugs $f$ with its ends projecting beyond said lugs and fitted with thumb nuts G adapted to bear against said lugs for tightening or clamping the gage at any desired position to the blade. It will be observed that tightening either of the thumb nuts G will serve to clamp the gage in the desired position so that it can be adjusted with equal facility from either side of the saw, according to which is in use at the time.

The inner end of the handle is fitted with a metal edging plate K secured by screws $k$ or the like, and extending at right angles to the rear or upper edge of the blade. A portion of this plate is cut away at $k'$ to receive the plate portion F of the gage, and at $k^2$ to receive the thumb nut G, in order to permit the gage to be withdrawn and arranged flush with the inner face of the edging plate K when the device is to be used as a try-square. To further provide for this withdrawal of the gage, a cavity $k^3$ is formed in the handle as a continuation of the cut away portion $k^2$ of the edging plate. It will be understood of course that the cut away portions and cavity just described are duplicated on the other side of the saw, as clearly shown in Figs. 2 and 3.

Having thus described my invention, what I claim as new and desire to secure by Letters Patent of the United States is:—

A tool having a blade provided with an arcuate slot, a gage comprising plate portions arranged on opposite sides of the blade, means extending into the slot from the gage for guiding the same along the slot, a screw-threaded pin spaced from said guarding means and passed through the slot and gage, and thumb nuts on the opposite ends of said pin for clamping the gage to the blade at either side thereof.

In testimony whereof I have signed my name to this specification in the presence of two attesting witnesses.

JAMES M. NUGENT.

Witnesses:
   Chas. W. Brown,
   Jacob A. Carter.

Copies of this patent may be obtained for five cents each, by addressing the "Commissioner of Patents, Washington, D. C."